United States Patent
Capek et al.

[15] 3,683,469
[45] Aug. 15, 1972

[54] METHOD OF FABRICATING MULTILAYER CERAMIC CAPACITORS

[72] Inventors: Raymond G. Capek, Elmhurst; Frank T. Takahashi, Chicago, both of Ill.

[73] Assignee: Zenith Radio Corporation, Chicago, Ill.

[22] Filed: Aug. 14, 1970

[21] Appl. No.: 63,811

[52] U.S. Cl............29/25.42, 29/420.5, 29/DIG. 31, 264/61, 264/63, 317/261
[51] Int. Cl. ............................................H01g 13/00
[58] Field of Search...29/DIG. 31, 25.42, 420, 420.5; 317/261; 264/61, 63

[56] References Cited

UNITED STATES PATENTS

R26,421  7/1968  Rodriguez et al.........29/25.42
3,496,434  2/1970  Prokopowicz.........317/261 X
3,379,943  4/1968  Breedlove..............317/261 X

*Primary Examiner*—John F. Campbell
*Assistant Examiner*—Carl E. Hall
*Attorney*—John J. Pederson

[57]  ABSTRACT

A method of fabricating a multilayer capacitor comprising alternate layers of ceramic dielectric material and metal electrodes. Preformed unfired ceramic dielectric pills having major surfaces coated with metal electrodes of lesser area than the coated surfaces are stacked with alternate layers of unfired ceramic dielectric powder fill. The stack is subjected to pressure to form a unitary compacted and pre-electroded multilayer element of unfired ceramic dielectric material, and the multilayer element is then fired to ceramic maturity.

7 Claims, 3 Drawing Figures

PATENTED AUG 15 1972  3,683,469

Inventors
Raymond G. Capek
Frank T. Takahashi
By *John J. Pederson*
Attorney

METHOD OF FABRICATING MULTILAYER CERAMIC CAPACITORS

BACKGROUND OF THE INVENTION

The present invention relates to a method of fabricating a multilayer ceramic capacitor, and more specifically to a method of fabricating a multilayer ceramic capacitor for high-voltage applications.

One example of a need for such a device is in the modern television receiver. The high voltage accelerating potential needed for a television picture tube, approximately 20 to 25 KV, has heretofore been produced by a transformer in conjunction with a vacuum tube rectifier. This combination requires a considerable amount of space on the television receiver chassis, and is inconsistent with current objectives and trends toward all solid-state receiver design.

One possible alternative for the high voltage rectifier is a voltage multiplier utilizing solid-state rectifiers with lower voltage ratings. These multipliers require a plurality of high voltage capacitors. Discrete capacitors, although having been made to work successfully in this type of circuit, have created some problems. For instance, the lead wires of the discrete capacitors must be placed far apart to prevent arcing between the leads. Another problem associated with discrete capacitors in a multiplier circuit is that their temperature coefficients are not identical; thus the performance of the multiplier varies with changes in temperature.

A multilayer ceramic capacitor would be ideal to fill this need. All of the capacitors could be incorporated within the same dielectric material resulting in identical characteristics. The capacitors would occupy less component space than discrete capacitors and could easily be encapsulated within the same package. Also, if the proper multilayer geometry is chosen, the rectifying diodes could be easily secured to the proper capacitor terminals and be encapsulated with the multilayer capacitor. This would virtually eliminate corona and arcing because there would be no exposed capacitor or diode leads.

Unfortunately, however, conventional methods of fabricating multilayer capacitors cannot be used for this application. Multilayer ceramic capacitors have been fabricated by using very thin sheets of dielectric material between the various electrodes. Because these sheets of ceramic dielectric material are thin, they cannot withstand the high voltages required. Therefore it is necessary to increase the thickness of the ceramic dielectric layers. However, efforts to apply prior art methods to make high voltage capacitors with individual thick sheets of ceramic dielectric material bonded together to obtain the necessary layer thickness have been generally unsuccessful. Even if the layers are made thick enough, insufficient bonding between the different capacitor layers is encountered, especially if multiple thin sheets of dielectric material are bonded together to obtain the required layer thickness. Insufficient bonding between the various layers results in arcing between the layers and ultimate inoperability. If enough bonding material and plasticizer are used to insure complete bonding between the interfaces, then long burn-out periods are necessary to dispense with the organic materials employed. These burn-out periods may last for days and even then all of the organic materials may still not be removed, resulting in high processing expense and non-uniformity of the finished product.

Therefore it is an object of the present invention to provide a new and improved method of fabricating multilayer ceramic capacitors for high voltage applications.

A further object of the present invention is to provide a method of fabricating multilayer ceramic capacitors that is economical and also results in capacitors with uniform characteristics.

SUMMARY OF THE INVENTION

The invention provides a method of fabricating a multilayer ceramic capacitor. A plurality of preformed pills of unfired ceramic dielectric material are provided. At least one major surface of each of the pills is coated with a conductive electrode of smaller area than the major surface on which it is coated. The pills are stacked with alternate layers of unfired ceramic dielectric powder fill. Pressure is then applied to the stack to form a unitary compacted and pre-electroded multilayer element of unfired ceramic dielectric material. The multilayer element is thereafter fired to ceramic maturity.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

The present invention provides a method of making a high voltage multilayer ceramic capacitor 1 which is typically of a five-layer cylindrical construction but which may employ other numbers of layers and be of other configurations if desired. Capacitor 1 comprises a plurality of layers of ceramic dielectric material with intervening metal electrodes, and conductive leads 2 are provided to permit external circuit connections to the several interlayer electrodes. A typical ceramic dielectric composition is by weight: 84 percent barium titanate, 12.3 percent calcium titanate, 3.0 percent magnesium zirconate, 0.5 percent zircon, and 0.1 percent iron oxide, although virtually any ceramic dielectric composition may be employed.

Figure 2:
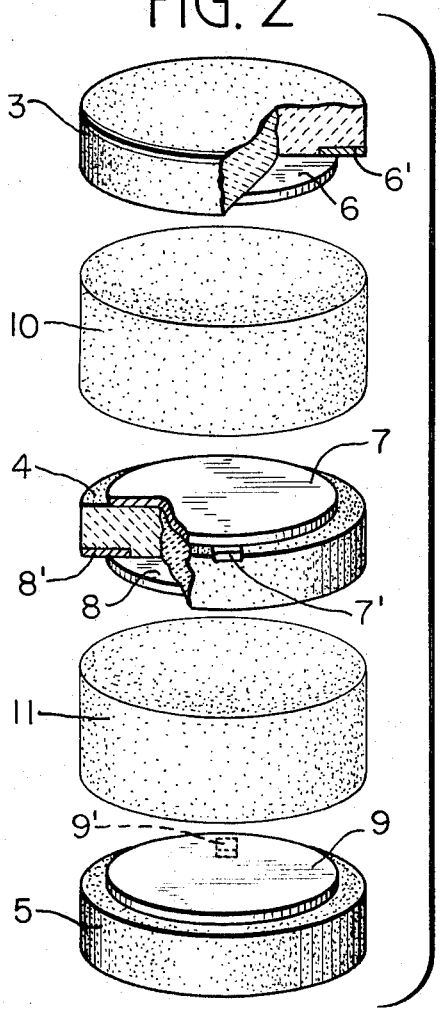
FIG. 2 is an exploded perspective view illustrating an intermediate step in the inventive method of making the multilayer ceramic capacitor of FIG. 1.

The new and improved method of the present invention may best be visualized by reference to FIG. 2. A plurality of preformed pills 3, 4 and 5 of the selected green or unfired ceramic dielectric material are provided by conventional processes, as by pressing unfired ceramic dielectric powder with a polyvinyl alcohol binder at a relatively low pressure which is insufficient to fully compact the dielectric powder. For example, if the dielectric powder is of a composition and particle size to require a pressure in excess of 10,000 pounds per square inch for full compaction, the pressure used in preforming pills 3–5 may be from 2,500 to 5,000 pounds per square inch.

The preformed pills 3, 4 and 5 are coated with metal electrodes by metal paste screening techniques well known in the art. For example, a palladium alloy paste such as No. 10361 manufactured by DuPont may be used. The electrode coatings are made smaller in area than the pill surfaces to which they are applied, to leave uncoated a substantial portion of the pill surfaces; preferably in a cylindrical construction, the electrode coatings are circular but of a diameter approximately one-fourth inch smaller than the pills to leave an uncoated peripheral area approximately one-eighth inch in width on each pill. This is of great importance in achieving optimum interface bonding between the layers, as to which more will be said later.

Center layer 4 is provided with metal electrodes 7 and 8 on both sides and end layers 3 and 5 are provided with respective single metal electrodes 6 and 9. Each of the metal electrodes 6–9 is provided with a narrow-strip conductive terminal, identified by a corresponding primed reference numeral, which may most conveniently be formed of the same metal paste as the electrodes and is preferably inlaid in the electroded pill surface, as shown, to avoid loss of identification after the subsequent final pressing operation to be described.

Pills 3, 4 and 5 are stacked with alternate layers 10 and 11 of unfired ceramic dielectric powder fill of the same composition. The powder fill layers 10 and 11 each contain approximately the same weight of dielectric material as the individual pills 3, 4 and 5 if a final construction having uniform layer thickness is desired. Having been partially pre-compacted, pills 3–5 are of lesser thickness than powder layers 10 and 11, as shown.

Figure 1:
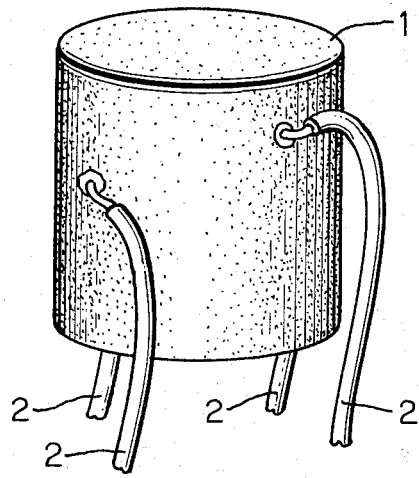
FIG. 1 is a perspective view of a high voltage multilayer ceramic capacitor of a type which may be made by the method of the present invention.
Figure 3:
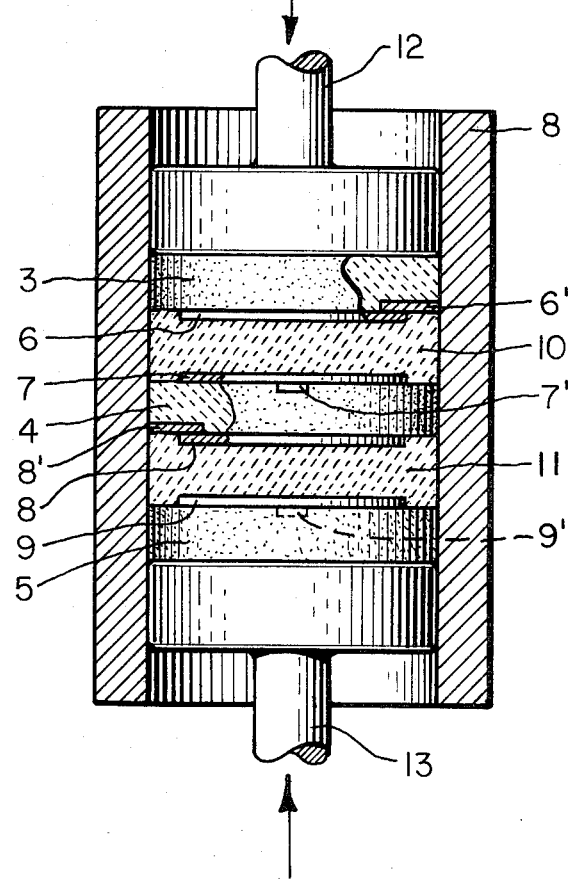
FIG. 3 is a cross-sectional view partially cut away of a die cavity which may be employed in practicing the method of the present invention.

The alternate layers of preformed pills 3–5 and powder fill layers 10 and 11 are stacked in a cylindrical die cavity in the sequence shown in FIG. 3. Successive terminals 6'–9' are spaced 90° apart for optimum separation of the external lead connections 2 (FIG. 1). Pistons 12 and 13 are actuated as indicated by the arrows to exert a relatively high pressure of the order of 10,000 pounds or more per square inch; the forming pressure is not critical as long as it is at least twice the pressure used in providing the compacted pills and may be anywhere in the range from 5,000 to 70,000 pounds per square inch for various typical dielectric compositions. During this pressing, layers 10 and 11 and layers 3–5, become equally compact and the powder fill is compressed into direct engagement with the non-electroded peripheral portions of the confronting major surfaces of pills 3–5, so that a unitary compacted and pre-electroded multilayer element of unfired ceramic dielectric material is formed. The thickness of each of the layers 6–9 after this final pressing may be 0.235 inch, for example. Piston 12 may be removed and piston 13 inserted to eject the compacted multilayer unit.

After pressing, the multilayer unit is placed into a kiln and fired by gradually increasing the temperature at a rate of approximately 100° F. per hour until the firing temperature is reached. At about 500° F., the polyvinyl alcohol binder of the compacted pills volatilizes and is expelled. For the particular dielectric composition specified above, the firing temperature is 2,450° F.; this temperature may be attained in about 22 hours and is held at or slightly above the firing temperature for about two hours to complete the firing cycle. The kiln is then allowed to cool for 12 hours at an uncontrolled cooling rate, whereupon the multilayer ceramic capacitor is removed and allowed to cool further to room temperature. Then the capacitor leads are fastened to the capacitor electrode terminals.

Multilayer ceramic capacitors fabricated in accordance with the present invention have operated without failure in voltage multipliers for developing high voltage outputs in excess of 20 KV. To provide complete bonding of the interfaces between the various layers, and thus prevent corona and arcing, it has been found essential to leave a substantial uncoated area on each electroded surface of the preformed pill layers 3–5 for direct contact with the powder fill of layers 10 and 11 during the final pressing operation; in practice, the provision of a peripheral uncoated area of a width of approximately one-eighth inch has been found sufficient to insure complete bonding in constructions of widely different sizes and configurations.

With the method of the invention, it has been found that completely bonded corona- and arc-free units are obtained while using extremely small amounts of binder material in the dielectric powder, e.g., approximately 3 percent by weight rather than the 12–15 percent or more typically required when using other processes. In addition to the obvious advantages of economy and of dispensing with the necessity of providing long burn-out cycles, the lower binder concentration yields greater uniformity in construction and operating characteristics of the finished product.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A method of fabricating a multilayer ceramic capacitor comprising:
   providing a plurality of preformed pills of unfired ceramic dielectric material with at least one major surface of each of said pills being coated with a conductive electrode of smaller area than such major surface;
   stacking said pills with alternate layers of unfired ceramic dielectric fill in uncompressed powder form;
   applying pressure to the stack to form a unitary compacted and pre-electroded multilayer element of unfired ceramic dielectric material;
   and firing said multilayer element to ceramic maturity.

2. A method of fabricating a multilayer ceramic capacitor comprising:
   forming a plurality of preformed pills of unfired ceramic dielectric material by compressing unfired ceramic dielectric powder at a predetermined first pressure;

coating at least one major surface of each said preformed pill with a conductive electrode of smaller area than such major surface;

stacking said pills with alternate layers of unfired ceramic dielectric fill in uncompressed powder form;

compressing the stack at a second pressure higher than said predetermined first pressure to form a unitary compacted and pre-electroded multilayer element of unfired ceramic dielectric material;

and firing said multilayer element to ceramic maturity.

3. A method according to claim 2, in which said predetermined first pressure is insufficient to fully compact said dielectric powder.

4. A method of fabricating a multilayer ceramic capacitor in accordance with claim 3, where the stack is compressed at a pressure at least twice said predetermined pressure used in forming said preformed pills.

5. A method of fabricating a multilayer ceramic capacitor in accordance with claim 2, in which said conductive electrodes are of substantially the same configuration as the major surfaces of said pills and in which the electrode coatings are applied to leave uncoated peripheral areas of approximately one-eighth inch in width on such major surfaces.

6. A method of fabricating a multilayer ceramic capacitor in accordance with claim 5, which includes the further step of bridging the uncoated peripheral areas of each electroded major surface with a narrow strip of inlaid conductive material to constitute terminal leads for said electrodes.

7. A method of fabricating a multilayer ceramic capacitor which requires substantially less binder than heretofore required in making such capacitors, which method comprises:

providing a plurality of preformed pills of unfired ceramic dielectric material containing only approximately 3 percent by weight of binder material with at least one major surface of each of said pills being coated with a conductive electrode of smaller area than such major surface;

stacking said pills with alternate layers of unfired ceramic dielectric fill in uncompressed powder form;

applying pressure to the stack to form a unitary compacted and pre-electroded multilayer element of unfired ceramic dielectric material;

and firing said multilayer element to ceramic maturity.

* * * * *